(12) United States Patent
Uematsu (10) Patent No.: US 12,027,322 B2
(45) Date of Patent: Jul. 2, 2024

(54) ELECTROLYTIC CAPACITOR

(71) Applicant: Panasonic Intellectual Property Management Co., Ltd., Osaka (JP)

(72) Inventor: Hidenori Uematsu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/229,628

(22) Filed: Aug. 2, 2023

(65) Prior Publication Data

US 2023/0377806 A1 Nov. 23, 2023

Related U.S. Application Data

(63) Continuation of application No. 17/499,920, filed on Oct. 13, 2021, now Pat. No. 11,756,738, which is a
(Continued)

(30) Foreign Application Priority Data

May 31, 2019 (JP) ................................. 2019-102611

(51) Int. Cl.
*H01G 9/012* (2006.01)
*H01G 9/048* (2006.01)
*H01G 9/08* (2006.01)

(52) U.S. Cl.
CPC ............. *H01G 9/012* (2013.01); *H01G 9/048* (2013.01); *H01G 9/08* (2013.01)

(58) Field of Classification Search
None
See application file for complete search history.

(56) References Cited

U.S. PATENT DOCUMENTS

| 6,236,561 B1 | 5/2001 | Ogino et al. |
| 11,756,738 B2 * | 9/2023 | Uematsu .................. H01G 9/08 |
| | | 361/528 |

(Continued)

FOREIGN PATENT DOCUMENTS

| CN | 101533714 A | 9/2009 |
| JP | 6-267711 | 9/1994 |

(Continued)

OTHER PUBLICATIONS

International Search Report of PCT application No. PCT/JP2020/020655 dated Sep. 1, 2020.
(Continued)

*Primary Examiner* — Eric W Thomas
(74) *Attorney, Agent, or Firm* — Rimon PC (57) ABSTRACT

An electrolytic capacitor includes a capacitor element, an exterior body covering the capacitor element, an anode terminal electrically connected to an anode body of the capacitor element, and a cathode terminal electrically connected to a cathode portion of the capacitor element. Each of the anode terminal and the cathode terminal includes a connection portion in contact with the capacitor element, a lead-out portion led out from the connection portion to an outer surface of the exterior body, and an external terminal portion disposed along the outer surface of the external body and having an exposed surface exposed from the external body. At least a part of a covered portion of the lead-out portion, the covered portion being covered with the exterior body, has a cross-sectional shape including a chamfered shape corner portion in a cross section parallel to a surface region of the outer surface of the exterior body where the lead-out portion is led out.

6 Claims, 9 Drawing Sheets

Related U.S. Application Data continuation of application No. PCT/JP2020/020655, filed on May 26, 2020.

(56) References Cited

U.S. PATENT DOCUMENTS

| | | |
|---|---|---|
| 2002/0021547 A1 | 2/2002 | Sakai et al. |
| 2009/0231784 A1 | 9/2009 | Matsuoka et al. |
| 2011/0261505 A1 | 10/2011 | Matsuoka |
| 2013/0111720 A1 | 5/2013 | Ihara |
| 2015/0194262 A1 | 7/2015 | Chiu et al. |
| 2019/0214199 A1 | 7/2019 | Ueda et al. |
| 2019/0333705 A1 | 10/2019 | Sato et al. |
| 2021/0125787 A1 | 4/2021 | Iwaoka et al. |

FOREIGN PATENT DOCUMENTS

| | | |
|---|---|---|
| JP | 2000-077269 | 3/2000 |
| JP | 2002-025863 A | 1/2002 |
| JP | 2009-218502 | 9/2009 |

OTHER PUBLICATIONS

English Translation of Chinese Office Action dated Nov. 14, 2022 for the related Chinese Patent Application No. 202080038635.4.
Notice of Allowance issued in U.S. Appl. No. 17/499,920, dated May 3, 2023.
Non-Final Office Action issued in U.S. Appl. No. 17/499,920, filed Jan. 27, 2023.

* cited by examiner

ELECTROLYTIC CAPACITOR

RELATED APPLICATIONS

This application is a continuation of U.S. application Ser. No. 17/499,920 filed Oct. 13, 2021, which is a continuation of the PCT International Application No. PCT/JP2020/020655 filed on May 26, 2020, which claims the benefit of foreign priority of Japanese patent application No. 2019-102611 filed on May 31, 2019, the contents all of which are incorporated herein by reference.

BACKGROUND

1. Technical Field

The present disclosure relates to an electrolytic capacitor including a capacitor element.

2. Description of the Related Art

An electrolytic capacitor includes a capacitor element, an exterior body covering the capacitor element, an anode terminal electrically connected to an anode body of the capacitor element, and a cathode terminal electrically connected to a cathode portion of the capacitor element. Each of the anode terminal and the cathode terminal includes a connection portion in contact with the capacitor element, a lead-out portion disposed continuously to the connection portion and led out from the connection portion to an outer surface of the exterior body, and an external terminal portion disposed continuously to the lead-out portion and disposed along the outer surface of the external body. The external terminal portion has an exposed surface exposed from the external body. In Unexamined Japanese Patent Publication No. 2000-77269, a stepwise cathode terminal is used. The stepwise cathode terminal is constituted by a connection portion and an external terminal portion in parallel to each other and a lead-out portion as a step portion.

SUMMARY

An electrolytic capacitor according to one aspect of the present disclosure includes a capacitor element, an exterior body covering the capacitor element, an anode terminal, and a cathode terminal. The capacitor element includes an anode body, a dielectric layer disposed on a surface of the anode body, and a cathode portion disposed on a surface of the dielectric layer. The anode terminal is electrically connected to the anode body. The cathode terminal is electrically connected to the cathode portion. Each of the anode terminal and the cathode terminal includes a connection portion in contact with the capacitor element, a lead-out portion disposed continuously to the connection portion and led out from the connection portion to an outer surface of the exterior body, and an external terminal portion disposed continuously to the lead-out portion and disposed along the outer surface. The external terminal portion has an exposed surface exposed from the exterior body. At least a part of a covered portion of the lead-out portion of at least one of the anode terminal or the cathode terminal has a cross-sectional shape including a chamfered shape corner portion in a cross section parallel to a surface region of the outer surface where the lead-out portion is led out. The covered portion of the lead-out portion is covered with the exterior body.

According to the present disclosure, in the electrolytic capacitor, occurrence of a crack in the exterior body can be suppressed.

DETAILED DESCRIPTION OF EMBODIMENT

An electrolytic capacitor would be exposed to a high temperature, for example, by reflow-type soldering to a substrate. When the electrolytic capacitor is exposed to a high temperature, a capacitor element and an exterior body expand. At this time, a stress is concentrated on an interface portion where the exterior body and a corner portion of a lead-out portion are in contact with each other, and a crack in the exterior body may be generated from the interface portion as a starting point. The crack reduces sealability of the electrolytic capacitor and reduces reliability of the electrolytic capacitor.

An electrolytic capacitor according to an exemplary embodiment of the present disclosure includes a capacitor element and an exterior body covering the capacitor element. The capacitor element includes an anode body, a dielectric layer disposed on a surface of the anode body, and a cathode portion disposed on a surface of the dielectric layer. Moreover, the electrolytic capacitor includes an anode terminal electrically connected to the anode body, and a cathode terminal electrically connected to the cathode portion. Each of the anode terminal and the cathode terminal (hereinafter, also referred to as an electrode terminal) includes a connection portion in contact with the capacitor element, a lead-out portion disposed continuously to the connection portion and led out from the connection portion to an outer surface of the exterior body, and an external terminal portion disposed continuously to the lead-out portion and disposed along the outer surface of the exterior body. The external terminal portion has an exposed surface exposed from the exterior body. At least a part of a covered portion (hereinafter, also referred to as covered portion A) of the lead-out portion of at least one of the anode terminal or the cathode terminal has a cross-sectional shape including a chamfered shape corner portion in a cross section (hereinafter, also referred to as cross section B) parallel to a surface region of the outer surface of the exterior body where the lead-out portion is led out. The covered portion of the lead-out portion is covered with the exterior body.

By forming a corner portion of the lead-out portion into a chamfered shape, concentration of stress at an interface portion where the exterior body and the corner portion of the lead-out portion are in contact with each other is alleviated at the time of expansion of the capacitor element or the like due to exposure of the electrolytic capacitor to a high temperature. Thus, a crack in the exterior body that is generated from the interface portion as a starting point is suppressed. Hence, sealability of the electrolytic capacitor is secured, and reliability of the electrolytic capacitor is improved.

When there is a region where a distance from a surface of the capacitor element to the outer surface of the exterior body is short, that is, a thin region where a thickness of the exterior body is small, the above-mentioned crack easily occurs in the thin region where the lead-out portion is disposed. Thus, when the lead-out portion is disposed in the thin region and cross section B of the lead-out portion has the chamfered shape corner portion, an effect of suppressing the occurrence of the crack in the exterior body becomes remarkable.

It is preferable that at least at a boundary portion of the lead-out portion where the lead-out portion starts to be exposed from the outer surface of the exterior body, cross section B has the chamfered shape corner portion. The exterior body easily cracks from a portion of the lead-out portion in contact with the boundary portion as a starting point. Hence, when cross section B at the boundary portion has the chamfered shape corner portion, the effect of suppressing the occurrence of the crack in the exterior body becomes remarkable.

The boundary portion of the lead-out portion where the lead-out portion starts to be exposed from the outer surface of the exterior body may form a bent portion. And the lead-out portion may be continuously connected to the external terminal portion at the bent portion. In this case, it is preferable that at least cross section B corresponding to the bent portion has the chamfered shape corner portion on an inner side in a bending direction of the bent portion (a recessed portion side of the bent portion). The exterior body easily cracks from a portion in contact with the inner side of the bent portion in the bending direction as a starting point. Hence, when cross section B on the inner side in the bending direction of the bent portion has the chamfered shape corner portion, the effect of suppressing the occurrence of the crack in the exterior body becomes remarkable.

Cross section B of the lead-out portion may have a plurality of (e.g., two or four) corner portions. From the viewpoint of enhancing the effect of suppressing the occurrence of the crack, it is preferable that each of all corner portions in cross section B of at least a part of covered portion A of the lead-out portion is the chamfered shape corner portion. In addition, it is preferable that each of all corner portions in cross section B with respect to an entirety of covered portion A is the chamfered shape corner portion.

The chamfered shape of the corner portion of the lead-out portion is not particularly limited, and may be, for example, an R-chamfered shape or a C-chamfered shape. The R-chamfered shape is formed by R-chamfering that rounds a sharp corner portion. The C-chamfered shape is formed by C-chamfering that obliquely cuts a sharp corner portion at an angle of 45°. The R-chamfering is performed, for example, in a range of R 0.01 or more and R 0.05 or less. For example, in the case of R 0.05, the R-chamfering is performed so that the corner portion is formed to have a curved shape with a curvature radius of 0.05 mm. The C-chamfering is performed, for example, in a range of C 0.01 or more and C 0.05 or less. For example, in the case of C 0.05, the C-chamfering is performed so that a sharp corner portion is cut to remove a part having a cross section of a right-angled isosceles triangle having two sides of 0.05 mm. The chamfering of the corner portion of the lead-out portion may be performed simultaneously with the formation of the electrode terminal, or may be performed after the formation of the electrode terminal.

The exposed surface of the external terminal portion is used for, for example, solder connection to a substrate (not shown) that the electrolytic capacitor is to be mounted on. A lead frame can be used for the electrode terminal. For example, copper or a copper alloy is used for a material for the lead frame.

The electrode terminal can be produced, for example, by preparing a predetermined mold and performing punching on a metal sheet using the mold. The mold can form an electrode terminal including a lead-out portion having a chamfered shape corner portion.

Alternatively, the electrode terminal may be produced by the following method.

A metal sheet is punched to form an intermediate body (an electrode terminal before chamfering the corner portion of the lead-out portion). Meanwhile, a predetermined mold for chamfering a corner portion in a predetermined portion (at least a portion corresponding to the lead-out portion) of the intermediate body is prepared. Thereafter, the corner portion in the predetermined portion of the intermediate body is chamfered by punching using the mold.

Hereinafter, the exterior body and the capacitor element will be described in detail.

(Exterior Body)

The exterior body contains a resin material, and preferably, contains a cured product of a curable resin composition, and may contain a thermoplastic resin or a composition containing the thermoplastic resin. The exterior body can be formed by using a molding technique such as injection molding, insert molding, or compression molding. The exterior body can be formed, for example, by filling a predetermined portion with the curable resin composition or the thermoplastic resin (composition) using a predetermined mold to cover an external surface of the capacitor element and a part of the electrode terminal.

The curable resin composition may contain a filler, a curing agent, a polymerization initiator, a catalyst, and the like in addition to a curable resin. As the curable resin, for example, a compound (e.g., a monomer, an oligomer, or a prepolymer, or the like) cured or polymerized by heat is used. As the above-described compounds (or curable resins), an epoxy resin, a phenolic resin, a urea resin, polyimide, polyamide-imide, polyurethane, diallyl phthalate, unsaturated polyester, and the like are exemplified. The curable resin composition may contain a plurality of curable resins.

As the filler, for example, insulating particles (inorganic, organic) and/or fibers and the like are preferable. As an insulating material that constitute the filler, for example, insulating compounds (oxides or the like.) of silica, alumina, and the like, glass, mineral materials (talc, mica, clay or the like), and the like are exemplified. As the filler, a single type may be used or two or more types may be used in combination. The curing agent, the polymerization initiator, the catalyst, and the like are appropriately selected in accordance with a type of the curable resin.

As the thermoplastic resin, for example, polyphenylene sulfide (PPS), polybutylene terephthalate (PBT), or the like can be used. The composition containing the thermoplastic resin may contain the above-mentioned filler and the like in addition to the thermoplastic resin.

(Capacitor Element)

The capacitor element includes the anode body, the dielectric layer covering the anode body, and the cathode portion covering the dielectric layer.

(Anode Body)

The anode body may include an anode wire and a porous body of a valve metal. The anode wire has a first portion embedded in the porous body and a second portion led out to be planted from the porous body. And the connection portion of the anode terminal is connected to the second portion.

The porous body is, for example, a sintered body of a valve metal. One end of the anode wire is embedded in the sintered body. The anode body is obtained, for example, by pressurizing powders containing the valve metal in a state where one end portion of the anode wire is embedded in the powders, obtaining a molded body having a desired shape (e.g., block shape), and then sintering the molded body. As the valve metal contained in the porous body, tantalum and the like are exemplified.

As the anode body, a foil-like or plate-like base material containing a valve metal may be used. A surface of the base material is roughened by etching or the like. As a material of the base material, a valve metal, an alloy containing a valve metal, a compound containing a valve metal, and the like are exemplified. A single one of these may be used, or two or more may be used in combination. As the valve metal contained in the base material, aluminum, tantalum, niobium, titanium, and the like are exemplified.

When the above-described base material is used for the anode body, the anode body has a region facing the cathode portion and a region not facing the cathode portion. It is sufficient that at least in the region facing the cathode portion, the surface of the base material is roughened. In the region of the anode body not facing the cathode portion, a separation layer having insulating properties is formed on a portion adjacent to the cathode portion to cover the surface of the anode body in a band shape. And thus contact between the cathode portion and the anode body is restricted. The other portion in the region of the anode body not facing the cathode portion is electrically connected to the anode terminal by welding.

(Dielectric Layer)

The dielectric layer contains an oxide of a valve metal (e.g., aluminum oxide, tantalum pentoxide, or the like). The dielectric layer is formed along the porous surface (including inner wall surfaces of pores) of the anode body. A surface of the dielectric layer has irregularities corresponding to the shape of the surface of the anode body.

The dielectric layer is formed, for example, by anodizing the surface of the anode body. The anodization can be performed by a publicly known method such as an anodization treatment. The anodization treatment can be performed, for example, by immersing the anode body in an anodization liquid to impregnate the surface of the anode body with the anodization liquid, and applying a voltage between the anode body as an anode, and a cathode immersed in the anodization liquid. As the anodization liquid, for example, a phosphoric acid aqueous solution or the like can be used.

(Cathode Portion)

The cathode portion includes a solid electrolyte layer covering at least a part of the dielectric layer, and a cathode lead-out layer covering the solid electrolyte layer. The cathode lead-out layer includes, for example, a carbon layer covering the solid electrolyte layer, and a silver paste layer covering the carbon layer. The silver paste layer of the cathode portion is electrically connected to the connection portion of the cathode terminal with an adhesive layer interposed, the adhesive layer being formed of a conductive adhesive.

The solid electrolyte layer contains, for example, a manganese compound and a conductive polymer. As the conductive polymer, for example, polypyrrole, polythiophene, polyaniline, derivatives thereof, and the like can be used. The solid electrolyte layer may contain a dopant. More specifically, the solid electrolyte layer may contain poly (3,4-ethylenedioxythiophene) (PEDOT) as the conductive polymer, and polystyrene sulfonic acid (PSS) as the dopant.

The solid electrolyte layer is formed, for example, by chemical polymerization and/or electrolytic polymerization of raw material monomer on the dielectric layer. Alternatively, the solid electrolyte layer may be formed by causing a treatment liquid containing a conductive polymer to adhere to the dielectric layer, and then drying the resultant. The treatment liquid may further contain another component such as a dopant. The treatment liquid is a conductive polymer dispersion liquid, or a conductive polymer solution. As a dispersion medium (solvent), for example, water, an organic dispersion medium (organic solvent), and a mixture thereof are exemplified.

The carbon layer is only required to have conductivity, and is formed by using, for example, a conductive carbon material such as graphite. The silver paste layer is formed by using, for example, a composition containing silver powders and a binder resin (an epoxy resin or the like).

Figure 1:
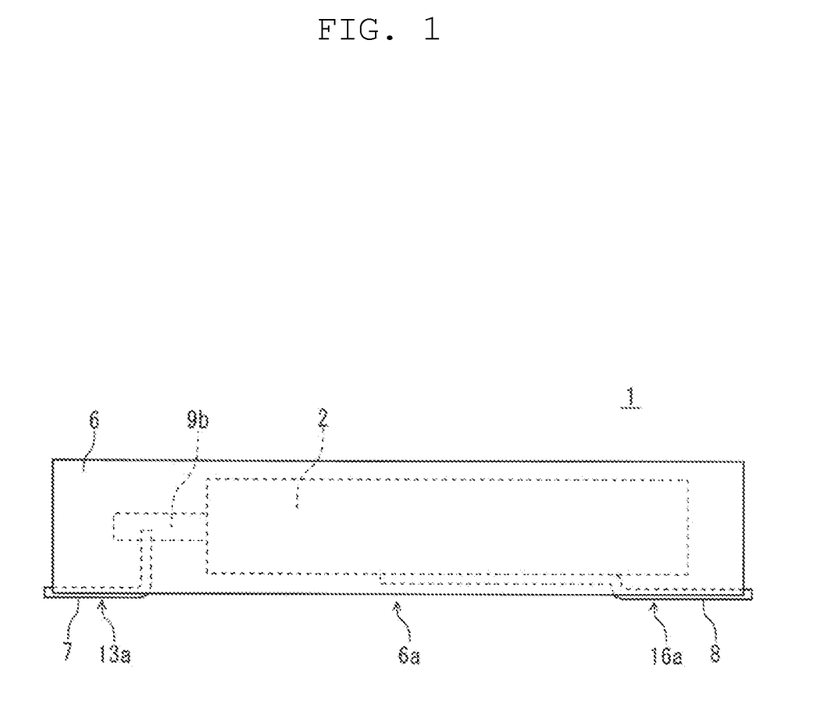
FIG. 1 is a front view illustrating one example of an electrolytic capacitor according to an exemplary embodiment of the present disclosure.
Figure 2:
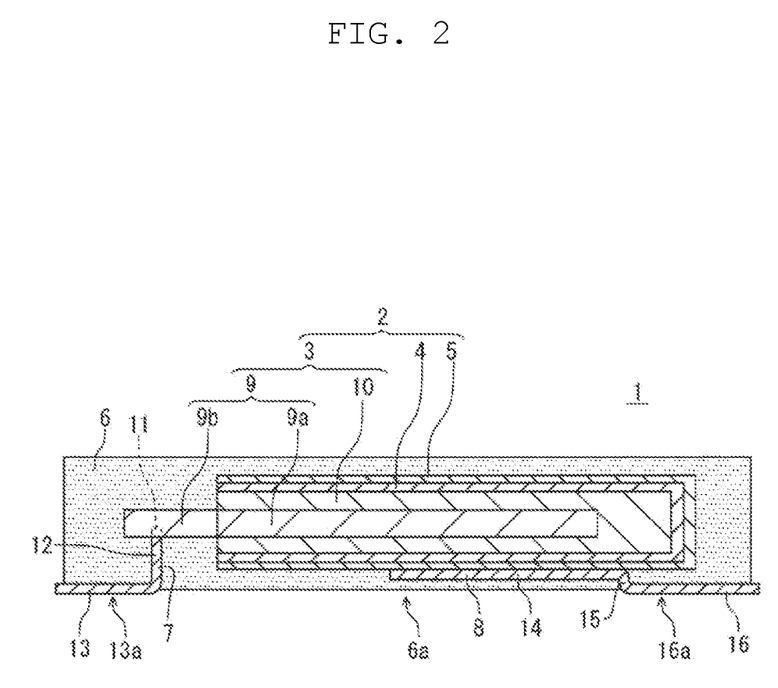
FIG. 2 is a longitudinal cross-sectional view illustrating the electrolytic capacitor in FIG. 1.
Figure 3:
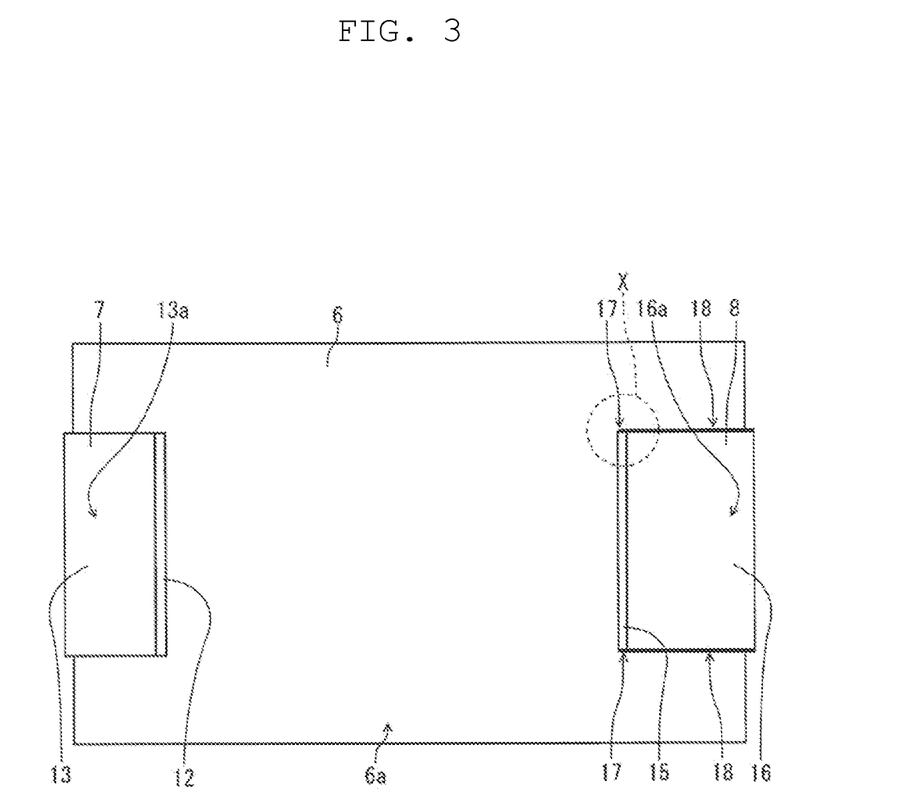
FIG. 3 is a bottom view illustrating the electrolytic capacitor in FIG. 1.
Figure 4:
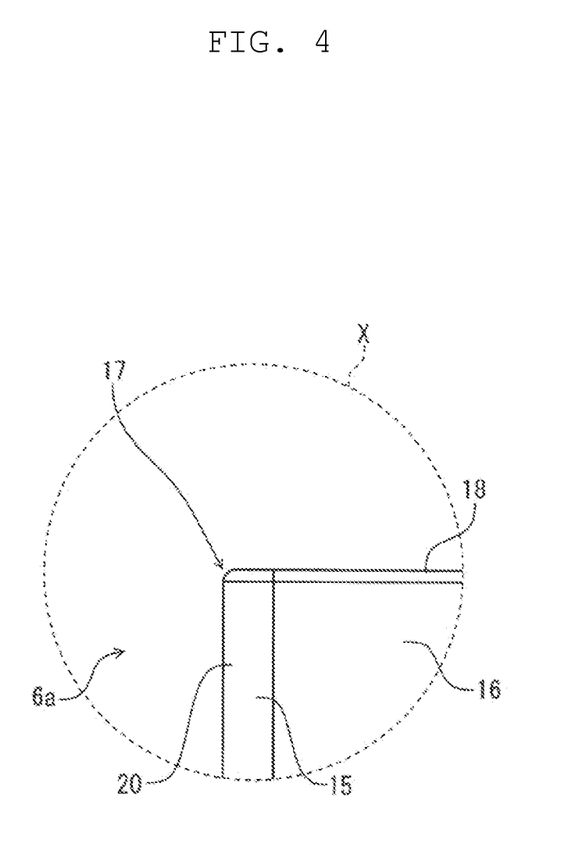
FIG. 4 is an enlarged view of portion X in FIG. 3.
Figure 5:
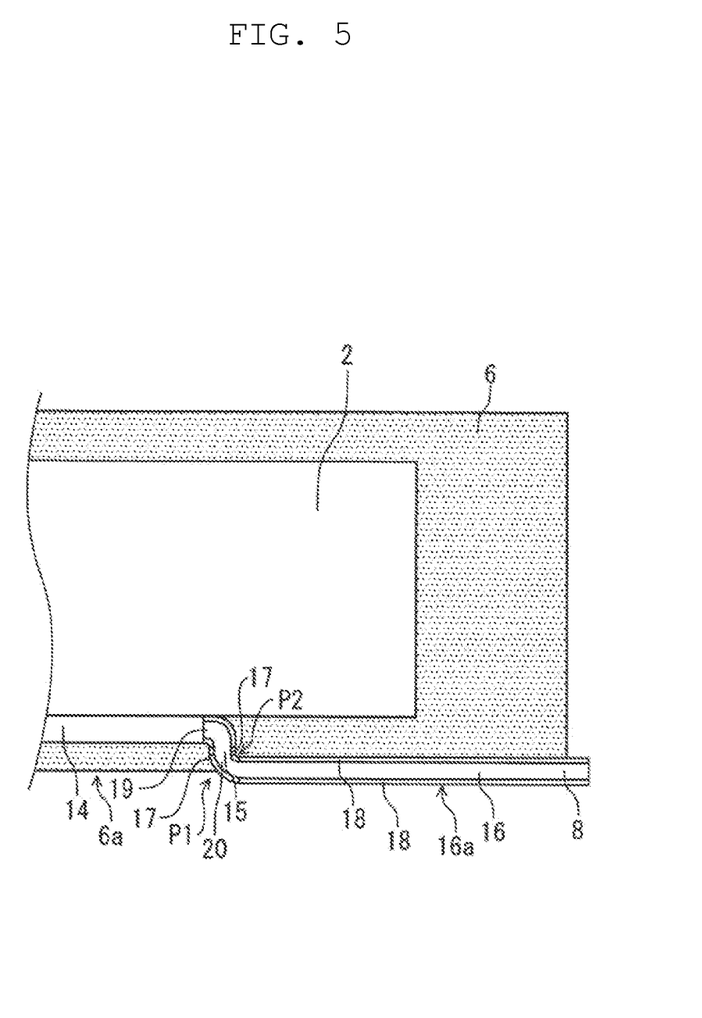
FIG. 5 is a front view of a main part of the electrolytic capacitor in FIG. 1, showing a part of the electrolytic capacitor in a cross section.
Figure 6:
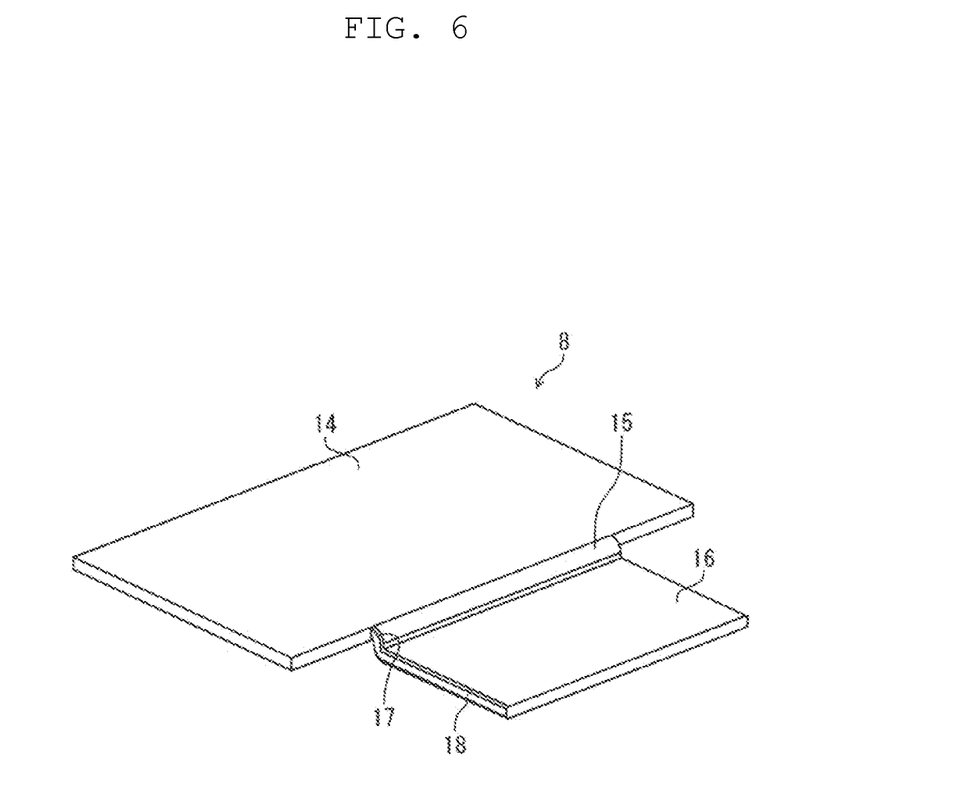
FIG. 6 is a perspective view of a cathode terminal in the electrolytic capacitor in FIG. 1.

One example of the electrolytic capacitor according to the exemplary embodiment of the present disclosure will be described herein with reference to FIGS. 1 to 6. FIG. 1 is a front view illustrating one example of the electrolytic capacitor according to the exemplary embodiment of the present disclosure. FIG. 2 is a longitudinal cross-sectional view illustrating the electrolytic capacitor in FIG. 1. FIG. 2 illustrates a cross section perpendicular to side surface 6a of exterior body 6 and along a length direction of anode wire 9. FIG. 3 is a bottom view illustrating the electrolytic capacitor in FIG. 1, and is a view illustrating the electrolytic capacitor as viewed from side surface 6a. FIG. 4 is an enlarged view of portion X in FIG. 3. FIG. 5 is a front view illustrating a main part of the electrolytic capacitor in FIG. 1, showing a part of the electrolytic capacitor in a cross section. In FIG. 5, for convenience, only exterior body 6 is shown in a cross section. P1 in FIG. 5 indicates a boundary portion where lead-out portion 15 starts to be exposed from side surface 6a of exterior body 6. P2 in FIG. 5 indicates an inner side of bent portion 20 in a bending direction (recessed portion side of bent portion 20). FIG. 6 is a perspective view illustrating a cathode terminal in the electrolytic capacitor in FIG. 1.

Electrolytic capacitor 1 includes capacitor element 2. Capacitor element 2 includes anode body 3, dielectric layer 4 disposed on a surface of anode body 3, and cathode portion 5 disposed on a surface of dielectric layer 4. Electrolytic capacitor 1 includes capacitor element 2, exterior body 6 covering capacitor element 2, anode terminal 7 electrically connected to anode body 3, and cathode terminal 8 electrically connected to cathode portion 5. Exterior body 6 has a substantially rectangular parallelepiped outer shape, and electrolytic capacitor 1 also has a substantially rectangular parallelepiped outer shape. Side surface 6a of exterior body 6 is one of six side surfaces of the rectangular parallelepiped shape that is an outer shape of exterior body 6.

Anode body 3 includes anode wire 9 and porous body 10 made of a valve metal. Anode wire 9 has first portion 9a embedded in porous body 10 and second portion 9b led out to be planted from porous body 10. Porous body is, for example, a porous sintered body of tantalum. Dielectric layer 4 is, for example, a layer of tantalum pentoxide.

Cathode portion 5 includes a solid electrolyte layer covering at least a part of dielectric layer 4 and a cathode lead-out layer covering the solid electrolyte layer. The cathode lead-out layer includes a carbon layer covering the solid electrolyte layer and a silver paste layer covering the carbon layer.

Anode terminal 7 includes connection portion 11 in contact with capacitor element 2, lead-out portion 12 disposed continuously to connection portion 11, and external terminal portion 13 disposed continuously to lead-out portion 12. Lead-out portion 12 is led out from connection portion 11 disposed in exterior body 6 to side surface 6a of exterior body 6. External terminal portion 13 is disposed along side surface 6a of exterior body 6 and has exposed surface 13a. Connection portion 11 of anode terminal 7 is connected to second portion 9b of anode wire 9 by welding. A part of external terminal portion 13 at a side close to exterior body 6 is embedded in exterior body 6.

Cathode terminal 8 includes connection portion 14 in contact with capacitor element 2, lead-out portion 15 disposed continuously to connection portion 14, and external terminal portion 16 disposed continuously to lead-out portion 15. Lead-out portion 15 is led out from connection portion 14 in exterior body 6 to side surface 6a of exterior body 6. External terminal portion 16 is disposed along side surface 6a of exterior body 6 and has exposed surface 16a. Connection portion 14 of cathode terminal 8 is electrically connected to the silver paste layer of cathode portion 5 with the adhesive layer (not shown) interposed, the adhesive layer being formed of the conductive adhesive.

In cathode terminal 8, connection portion 14 and external terminal portion 16 are disposed in parallel to each other. A term "parallel" as used herein means that an angle (acute angle) formed by connection portion 14 and external terminal portion 16 is equal to or more than 0° or less than or equal to 10°. As shown in FIGS. 2 and 6, cathode terminal 8 is formed in a stepwise shape constituted by connection portion 14, lead-out portion 15, and external terminal portion 16. Connection portion 14 and external terminal portion 16 are located at a side close to side surface 6a of exterior body 6 as viewed from capacitor element 2. Lead-out portion 15 has bent portion 19 at a boundary portion between lead-out portion 15 and connection portion 14, and has bent portion 20 at a boundary portion between lead-out portion 15 and external terminal portion 16. A part of bent portion 20 is exposed to an outside from side surface 6a of exterior body 6.

Cross section B of lead-out portion 15, which is in parallel to side surface 6a of exterior body 6 where lead-out portion 15 is led out, has chamfered shape corner portions 17. The chamfered shape of each of the corner portions 17 is an R-chamfered shape. A radius of curvature of each of R-chamfered shape corner portions 17 in cross section B is, for example, equal to or more than 0.01 mm and less than or equal to 0.05 mm.

In an entirety of covered portion A of lead-out portion 15, which is covered with exterior body 6, each of all corner portions of lead-out portion 15 in cross section B is chamfered shape corner portion 17. For example, cross section B at boundary portion P1 of lead-out portion 15 where lead-out portion starts to be exposed from side surface 6a of exterior body 6 has two chamfered shape corner portions 17. Cross section B corresponding to bent portion 20 has two chamfered shape corner portions 17 at inner side P2 and at an outer side in a bending direction of bent portion 20, respectively.

Lead-out portion 15 of stepwise cathode terminal 8 is disposed in a thin region where exterior body 6 has a small thickness (a region where a distance from side surface 6a of exterior body 6 to capacitor element 2 is short). The exterior body easily cracks from an interface portion as a starting point. The interface portion is a portion where the thin region and the corner portion of the lead-out portion of the cathode terminal are in contact with each other. Accordingly, since cross section B in lead-out portion 15 of cathode terminal 8 disposed in the thin region has chamfered shape corner portion 17, an effect of suppressing occurrence of a crack in the exterior body can be remarkably obtained.

At least at boundary portion P1 of lead-out portion 15 where lead-out portion 15 starts to be exposed from side surface 6a of exterior body 6, cross section B preferably has chamfered shape corner portion 17. The exterior body easily cracks from a portion in contact with boundary portion P1 of the lead-out portion as a starting point. Hence, since cross section B has chamfered shape corner portion 17 at boundary portion P1, the effect of suppressing the occurrence of a crack in the exterior body can be remarkably obtained.

As shown in FIGS. 1 and 2, a part of external terminal portion 16 at the side close to exterior body 6 is embedded in exterior body 6. In this case, as shown in FIG. 5, boundary portion P1 of lead-out portion 15 where lead-out portion 15 starts to be exposed from side surface 6a of exterior body 6 forms bent portion 20. That is, bent portion 20 includes boundary portion P1. Lead-out portion 15 is continuously connected to external terminal portion 16 at bent portion 20. In this case, at least cross section B corresponding to bent portion 20 preferably has chamfered shape corner portion 17 at inner side P2 in the bending direction of bent portion 20 (recessed portion side of bent portion 20). The exterior body easily cracks from a portion in contact with inner side P2 of the bent portion in the bending direction as a starting point. Hence, since cross section B has chamfered shape corner portion 17 at inner side P2 of bent portion 20 in the bending direction, the effect of suppressing the occurrence of a crack in the exterior body can be remarkably obtained.

In the present exemplary embodiment, external terminal portion 16 of cathode terminal 8 has chamfered shape corner portion 18 disposed continuously to chamfered shape corner portion 17 of lead-out portion 15. The corner portions of the external terminal portion may not have a chamfered shape.

In the present exemplary embodiment, in an entirety of covered portion A of lead-out portion 15, which is covered with exterior body 6, each of all corner portions in cross section B of lead-out portion 15 is chamfered shape corner portion 17. Meanwhile, it is sufficient that in at least a part of covered portion A, cross section B of the lead-out portion has the chamfered shape corner portion. Corner portions 17 and corner portions 18 each have an R-chamfered shape. Meanwhile, the chamfered shape of the corner portions may be a C-chamfered shape. Corner portions of lead-out portion 12 of anode terminal 7 do not have a chamfered shape. Meanwhile, the lead-out portion of the anode terminal may have chamfered shape corner portion.

Hereinafter, another example of the electrolytic capacitor according to the exemplary embodiment of the present disclosure will be described with reference to FIGS. 7 to 9.

Figure 7:
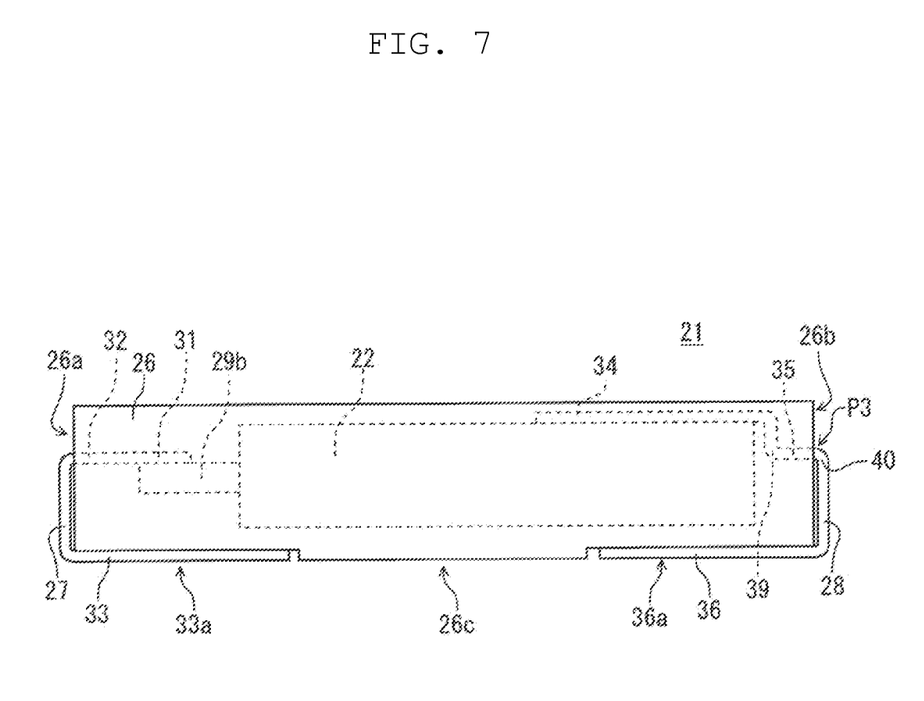
FIG. 7 is a front view illustrating another example of the electrolytic capacitor according to the exemplary embodiment of the present disclosure.
Figure 8:
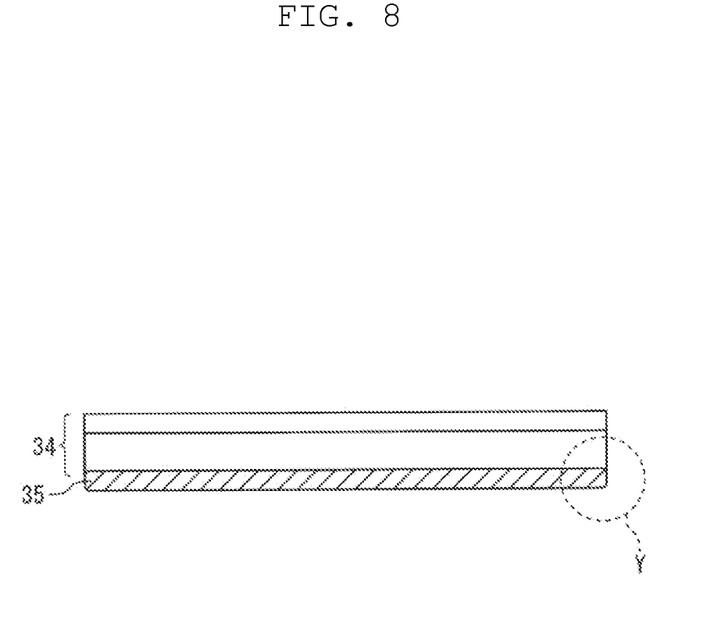
FIG. 8 is a cross-sectional view illustrating a cathode terminal in the electrolytic capacitor in FIG. 7 on a same plane as an outer surface of an exterior body where the cathode terminal is led out.

FIG. 7 is a front view illustrating the other example of the electrolytic capacitor according to the exemplary embodiment of the present disclosure. FIG. 8 is a cross-sectional view illustrating a cathode terminal in the electrolytic capacitor of FIG. 7 on a same plane as side surface 26b of an exterior body. From side surface 26b, the cathode terminal is led out. And FIG. 8 is a view illustrating cross section B at boundary portion P3 of lead-out portion 35 where lead-out portion 35 starts to be exposed from side surface 26b of exterior body 26. FIG. 9 is an enlarged view of portion Y in FIG. 8.

Electrolytic capacitor 21 includes capacitor element 22. Capacitor element 22 has a same configuration as capacitor element 2 in FIGS. 1 and 2. Electrolytic capacitor 21 includes capacitor element 22, exterior body 26 covering capacitor element 22, anode terminal 27 electrically connected to an anode body of capacitor element 22, and cathode terminal 28 electrically connected to a cathode portion of capacitor element 22. Exterior body 26 has a substantially rectangular parallelepiped outer shape, and electrolytic capacitor 21 also has a substantially rectangular parallelepiped outer shape. Side surfaces 26a to 26c of exterior body 26 are three side surfaces among six side surfaces of a rectangular parallelepiped shape that is the outer shape of exterior body 26. Side surface 26a and side surface 26b are located respectively at opposite sides to each other, and each have a perpendicular relationship with side surface 26c.

Anode terminal 27 includes connection portion 31 in contact with capacitor element 22, lead-out portion 32 disposed continuously to connection portion 31, and external terminal portion 33 disposed continuously to lead-out portion 32. Lead-out portion 32 is led out from connection portion 31 disposed in exterior body 26 to side surface 26a of exterior body 26. External terminal portion 33 is disposed along side surface 26a to side surface 26c of exterior body 26. A portion of external terminal portion 33 disposed along side surface 26c of exterior body 26 has exposed surface 33a. The portion having exposed surface 33a of external terminal portion 33 is disposed in a recessed portion formed on side surface 26c of exterior body 26. Connection portion 31 of anode terminal 27 is connected to second portion 29b of an anode wire of capacitor element 22 by welding.

Cathode terminal 28 includes connection portion 34 in contact with capacitor element 22, lead-out portion 35 disposed continuously to connection portion 34, and external terminal portion 36 disposed continuously to lead-out portion 35. Lead-out portion 35 is led out from connection portion 34 disposed in exterior body 26 to side surface 26b of exterior body 26. External terminal portion 36 is disposed along side surface 26b to side surface 26c of exterior body 26. A portion of external terminal portion 36 disposed along side surface 26c of exterior body 26 has exposed surface 36a. The portion having exposed surface 36a of external terminal portion 36 is disposed in a recessed portion formed on side surface 26c of exterior body 26. Connection portion 34 of cathode terminal 28 is electrically connected to a silver paste layer of the cathode portion of capacitor element 22.

As shown in FIG. 7, cathode terminal 28 is formed in a substantially U-shape constituted by connection portion 34, lead-out portion 35, and external terminal portion 36. Capacitor element 22 is located between a contact portion of connection portion 34 with capacitor element 22 and the portion of external terminal portion 36 having exposed surface 36a. Lead-out portion 35 has bent portion 39 at a boundary portion between lead-out portion 35 and connection portion 34 and has bent portion 40 at a boundary portion between lead-out portion 35 and external terminal portion 36. Bent portion 40 is exposed to an outside from side surface 26b of exterior body 26.

Figure 9:
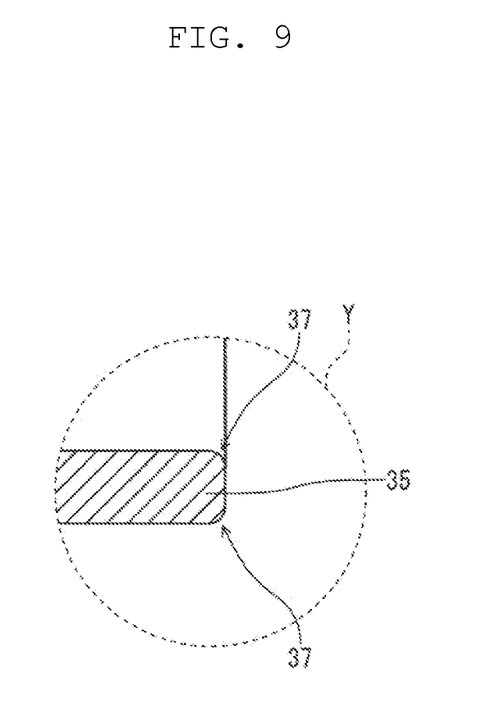
FIG. 9 is an enlarged view of portion Y in FIG. 8.

As shown in FIG. 9, cross section B of lead-out portion 35, which is in parallel to side surface 26b of exterior body 26 where lead-out portion 35 is led out, has chamfered shape corner portions 37. The chamfered shape of the corner portions 37 is an R-chamfered shape. In entirety of covered portion A of lead-out portion 35, which is covered with exterior body 26, each of all corner portions of lead-out portion 35 in cross section B is chamfered shape corner portion 37. For example, cross section B at boundary portion P3 of lead-out portion 35 where lead-out portion 35 starts to be exposed from side surface 26b of exterior body 26 has four chamfered shape corner portions 37.

A portion of lead-out portion 35 exposed to the outside from side surface 26b of exterior body 26 forms bent portion 40. That is, bent portion 40 does not include boundary portion P3 where lead-out portion 35 starts to be exposed from side surface 26b of exterior body 26. Lead-out portion 35 is continuously connected to external terminal portion 36 at bent portion 40. In this case, it is preferable that cross section B has chamfered shape corner portion 37 at least at boundary portion P3 of lead-out portion 35 where lead-out portion 35 starts to be exposed from side surface 26b of exterior body 26.

In the present exemplary embodiment, in entirety of covered portion A of lead-out portion 35, which is covered with exterior body 26, each of all corner portions in cross section B of lead-out portion 35 is chamfered shape corner portion 37. Meanwhile, it is sufficient that in at least a part of covered portion A, cross section B of the lead-out portion has the chamfered shape corner portion. Corner portions 37 each have an R-chamfered shape. Meanwhile, the corner portion may have a C-chamfered shape. Corner portions of lead-out portion 32 of anode terminal 27 do not have a chamfered shape. Meanwhile, the lead-out portion of the anode terminal may have chamfered shape corner portion.

Even when the electrolytic capacitor is exposed to a high temperature environment, the electrolytic capacitor of the present disclosure can be used for various applications requiring high reliability.

What is claimed is:

1. An electrolytic capacitor comprising:
   a capacitor element including:
      an anode body,
      a dielectric layer disposed on a surface of the anode body, and
      a cathode portion disposed on a surface of the dielectric layer;
   an exterior body covering the capacitor element;
   an anode terminal electrically connected to the anode body; and
   a cathode terminal electrically connected to the cathode portion, wherein:
   each of the anode terminal and the cathode terminal includes:
      a connection portion in contact with the capacitor element;
      a lead-out portion led out from the connection portion to an outer surface of the exterior body, the lead-out portion being disposed continuously to the connection portion; and
      an external terminal portion having an exposed surface exposed from the exterior body, the external terminal portion being disposed along the outer surface and disposed continuously to the lead-out portion, at least a part of a covered portion of the lead-out portion of at least one of the anode terminal or the cathode terminal has a cross-sectional shape including a chamfered shape corner portion in a cross section parallel to a surface region of the outer surface where the lead-out portion is led out, the covered portion of the lead-out portion being covered with the exterior body, and a radius of curvature of the chamfered shape corner portion is equal to or more than 0.01 mm and less than or equal to 0.05 mm.

2. The electrolytic capacitor according to claim 1, wherein a boundary portion of the lead-out portion where the lead-out portion starts to be exposed from the outer surface has a cross-sectional shape including the chamfered shape corner portion in the cross section.

3. The electrolytic capacitor according to claim 1, wherein:
the boundary portion includes a bent portion,
the bent portion is continuously connected to the external terminal portion, and
the bent portion has a cross-sectional shape including the chamfered shape corner portion on an inner side in a bending direction of the bent portion in the cross section.

4. The electrolytic capacitor according to claim 1, wherein:
the connection portion of the cathode terminal and the external terminal portion of the cathode terminal are disposed in parallel to each other, and
the cathode terminal is formed in a stepwise shape constituted by the connection portion, the lead-out portion, and the external terminal portion of the cathode terminal.

5. The electrolytic capacitor according to claim 1, wherein:
the anode body includes an anode wire and a porous body of a valve metal,
the anode wire has a first portion embedded in the porous body and a second portion led out to be planted from the porous body, and
the connection portion of the anode terminal is connected to the second portion.

6. The electrolytic capacitor according to claim 1, wherein each of all corner portions in the cross-sectional shape is the chamfered shape corner portion.

* * * * *